(12) United States Patent
Fujita et al.

(10) Patent No.: US 11,757,134 B2
(45) Date of Patent: Sep. 12, 2023

(54) LITHIUM SECONDARY BATTERY AND METHOD FOR MANUFACTURING BATTERY-INCORPORATING DEVICE

(71) Applicant: NGK INSULATORS, LTD., Nagoya (JP)

(72) Inventors: Yuki Fujita, Nagoya (JP); Chiori Suzuki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 372 days.

(21) Appl. No.: 16/808,550

(22) Filed: Mar. 4, 2020

(65) Prior Publication Data
US 2020/0203773 A1   Jun. 25, 2020

Related U.S. Application Data

(63) Continuation of application No. PCT/JP2018/037431, filed on Oct. 5, 2018.

(30) Foreign Application Priority Data

Oct. 17, 2017   (JP) .................................. 2017-201105

(51) Int. Cl.
*H01M 10/0569* (2010.01)
*H01M 10/6554* (2014.01)
(Continued)

(52) U.S. Cl.
CPC ....... *H01M 10/0569* (2013.01); *H01M 4/131* (2013.01); *H01M 4/525* (2013.01);
(Continued)

(58) Field of Classification Search
CPC ......... H01M 10/0569; H01M 10/6554; H01M 50/46; H01M 4/131; H01M 4/525;
(Continued)

(56) References Cited

U.S. PATENT DOCUMENTS

2002/0068221 A1   6/2002   Watanabe et al.
2002/0192565 A1*  12/2002  Ueda ................. H01M 10/0569
                                                            429/231.1
(Continued)

FOREIGN PATENT DOCUMENTS

CN   1435906 A   8/2003
CN   1716681 A   1/2006
(Continued)

OTHER PUBLICATIONS

English machine translation of Chen (CN 101867059 A) (Year: 2010).*
(Continued)

*Primary Examiner* — Brian R Ohara
*Assistant Examiner* — Aaron J Salter
(74) *Attorney, Agent, or Firm* — BURR PATENT LAW, PLLC

(57) ABSTRACT

Provided is a secondary lithium battery including: a positive electrode plate that is a sintered lithium complex oxide plate; a negative electrode containing carbon and styrene butadiene rubber (SBR); and an electrolytic solution containing lithium borofluoride ($LiBF_4$) in a non-aqueous solvent composed of γ-butyrolactone (GBL), or composed of ethylene carbonate (EC) and γ-butyrolactone (GBL).

12 Claims, 6 Drawing Sheets

(51) Int. Cl.
- *H01M 4/131* (2010.01)
- *H01M 4/525* (2010.01)
- *H01M 4/80* (2006.01)
- *H01M 10/0525* (2010.01)
- *H01M 50/46* (2021.01)
- *H01M 4/02* (2006.01)
- *H01M 50/133* (2021.01)
- *H01M 50/129* (2021.01)
- *H01M 50/119* (2021.01)
- *H01M 50/121* (2021.01)

(52) U.S. Cl.
CPC ....... *H01M 4/803* (2013.01); *H01M 10/0525* (2013.01); *H01M 10/6554* (2015.04); *H01M 50/46* (2021.01); *H01M 50/119* (2021.01); *H01M 50/121* (2021.01); *H01M 50/129* (2021.01); *H01M 50/133* (2021.01); *H01M 2004/027* (2013.01); *H01M 2004/028* (2013.01)

(58) Field of Classification Search
CPC ............. H01M 4/803; H01M 10/0525; H01M 2004/027; H01M 2004/028
See application file for complete search history.

(56) References Cited

U.S. PATENT DOCUMENTS

| | | |
|---|---|---|
| 2003/0170549 A1 | 9/2003 | Murai |
| 2004/0224232 A1 | 11/2004 | Yamaguchi et al. |
| 2004/0229118 A1* | 11/2004 | Wensley ............. H01M 10/052 429/185 |
| 2010/0159333 A1* | 6/2010 | Sugiura ............... H01M 10/052 429/231.95 |
| 2012/0009471 A1 | 1/2012 | Sugiura et al. |
| 2015/0255766 A1* | 9/2015 | Shimizu .............. H01M 50/147 429/56 |
| 2015/0357678 A1 | 12/2015 | Tsubouchi |
| 2016/0072110 A1* | 3/2016 | Sugawara ............... B32B 27/34 429/144 |
| 2017/0084918 A1* | 3/2017 | Yang ................... H01M 4/1391 |
| 2018/0233744 A1 | 8/2018 | Ohira et al. |

FOREIGN PATENT DOCUMENTS

| | | | |
|---|---|---|---|
| CN | 101867059 A | * | 10/2010 |
| JP | H03-110765 A1 | | 5/1991 |
| JP | H11-031525 A1 | | 2/1992 |
| JP | H08-250153 A1 | | 9/1996 |
| JP | H10-312825 A1 | | 11/1998 |
| JP | 2002-100408 A1 | | 4/2002 |
| JP | 2005-005113 A1 | | 1/2005 |
| JP | 2012-209124 A1 | | 10/2012 |
| JP | 2013-084521 A1 | | 5/2013 |
| JP | 2013-097931 A1 | | 5/2013 |
| JP | 5587052 B2 | | 9/2014 |
| JP | 2015-230789 A1 | | 12/2015 |
| TW | 466791 B | | 12/2001 |
| TW | I598378 B | | 9/2017 |
| WO | 2017/146088 A1 | | 8/2017 |

OTHER PUBLICATIONS

International Search Report and Written Opinion (Application No. PCT/JP2018/037431) dated Jan. 8, 2019 (with English Translation).
Japanese Office Action (Application No. 2019-549212) dated Apr. 26, 2021 (with English translation).
Taiwanese Office Action (Application No. 107136259) dated Oct. 4, 2021.
Extended European Search Report (Application No. 18867785.0) dated Jun. 11, 2021.
Chinese Office Action (with English translation), Chinese Application No. 201880054323.5, dated Oct. 9, 2022 (21 pages).

* cited by examiner ated in laminated-film containers, where the electrode stack includes collectors for positive electrodes, positive electrodes, separators, negative electrodes, and collectors for negative electrodes. The film-packed batteries disclosed in PTLs 1 and 2 are lithium primary batteries.

LITHIUM SECONDARY BATTERY AND METHOD FOR MANUFACTURING BATTERY-INCORPORATING DEVICE

CROSS-REFERENCE TO RELATED APPLICATIONS

This application is a continuation application of PCT/JP2018/037431 filed Oct. 5, 2018, which claims priority to Japanese Patent Application No. 2017-201105 filed Oct. 17, 2017, the entire contents all of which are incorporated herein by reference.

BACKGROUND OF THE INVENTION

1. Field of the Invention

The present invention relates to a secondary lithium battery and a method for manufacturing a battery-incorporating device.

2. Description of the Related Art

In recent years, battery-incorporating smart cards have been put into practical use. Examples of smart cards that incorporate primary batteries include credit cards provided with a one-time password display function. Examples of smart cards that incorporate secondary batteries include cards provided with fingerprint authentication and wireless communication functions, the cards having ICs for wireless communication, ASICs for fingerprint analysis, and fingerprint sensors. Batteries for smart cards generally have several requirements, such as a thickness of less than 0.45 mm, high battery capacity, low electrical resistance, high bending resistance, and high resistance to process temperature of batteries.

For such applications, thin lithium batteries with liquid electrolyte have been proposed. For example, PTL 1 (JP2013-97931A) and PTL 2 (JP2012-209124A) disclose film-packed batteries including an electrode stack that is contained and sealed in laminated-film containers, where the electrode stack includes collectors for positive electrodes, positive electrodes, separators, negative electrodes, and collectors for negative electrodes. The film-packed batteries disclosed in PTLs 1 and 2 are lithium primary batteries.

Powder-dispersed positive electrodes are widely known as layers of positive electrode active material for lithium secondary batteries (also referred to as lithium ion secondary batteries), and are usually produced by kneading and molding particles of lithium complex oxide (typically, lithium-transition metal oxide) and additives, such as binders or conductive agents. Such powder-dispersed positive electrodes contain a relatively large amount (e.g., about 10% by weight) of binder that does not contribute to the capacity of battery, resulting in a low packing density of the positive electrode active material, i.e., lithium complex oxide. Accordingly, the powder-dispersed positive electrode should be further improved from the viewpoint of the capacity and charge/discharge efficiency. Some attempts have been made to improve the capacity and charge/discharge efficiency with positive electrodes or layers of positive electrode active material composed of sintered plate of lithium complex oxide. In this case, the positive electrode or the layer of positive electrode active material contains no binder; hence, high capacity and satisfactory charge/discharge efficiency can be expected due to a high packing density of lithium complex oxide. For example, PTL 3 (JP5587052B) discloses a positive electrode for secondary lithium battery including a collector of the positive electrode and a positive electrode active material layer connected to the collector of the positive electrode with a conductive bonding layer therebetween. The layer of positive electrode active material is composed of a sintered plate of lithium complex oxide, and the sintered plate has a thickness of 30 μm or more, a porosity of 3 to 30%, and an open pore rate of 70% or more.

PTL 4 (JPH10-312825A) discloses a secondary lithium battery including a mixed solvent consisting of 10 to 40% by volume of ethylene carbonate and 60 to 90% by volume of γ-butyrolactone as a non-aqueous solvent for an electrolytic solution in order to improve low-temperature discharge property.

CITATION LIST

Patent Literature

PTL1: JP2013-97931A
PTL2: JP2012-209124A
PTL3: JP5587052B
PTL4: JPH10-312825A

SUMMARY OF THE INVENTION

A hot lamination process may be applied to production of cards. The production of cards by a hot lamination process is performed, for example, through pressing of a card substrate and a resin film at a temperature of 110° C. or higher (e.g., 120 to 150° C.) and bonding to each other. Accordingly, the use of hot lamination process is advantageous in a method of incorporating a thin lithium battery in a low-profile device, such as a smart card. In this case, it is conceivable that a thin lithium battery and a protective film are sequentially stacked on a card substrate and pressed at a high temperature of 110° C. or more. However, a conventional thin lithium battery with liquid electrolyte has insufficient heat resistance, resulting in swelling, breaking and increase in electrical resistance of the battery when the battery is heated to 110° C. or more. In a procedure of mounting a thin lithium battery on a printed wiring board, a reflow soldering process may be used. This process also involves heating to a high temperature, thereby a similar problem as described above may occur.

The present inventors have now found that by selective combination of a positive electrode plate which is a lithium complex oxide sintered plate, a negative electrode containing carbon and styrene butadiene rubber (SBR), and an electrolytic solution containing lithium borofluoride (LiBF$_4$) in a non-aqueous solvent composed of γ-butyrolactone (GBL) and optional ethylene carbonate (EC), it is possible to provide a secondary lithium battery having superior heat resistance.

Accordingly, an object of the present invention is to provide a secondary lithium battery having superior heat resistance.

According to an aspect of the present invention, there is provided a secondary lithium battery, comprising:
- a positive electrode plate that is a lithium complex oxide sintered plate;
- a negative electrode containing carbon and styrene butadiene rubber (SBR); and
- an electrolytic solution containing lithium borofluoride (LiBF$_4$) in a non-aqueous solvent composed of γ-butyrolactone (GBL), or composed of γ-butyrolactone (GBL) and ethylene carbonate (EC).

According to another aspect of the present invention, there is provided a method for manufacturing a battery-incorporating device, comprising the steps of:
  providing the secondary lithium battery; and
  mounting the secondary lithium battery on a substrate by a process involving heating at 110° C. to lower than 260° C.

DETAILED DESCRIPTION OF THE INVENTION

Figure 1:
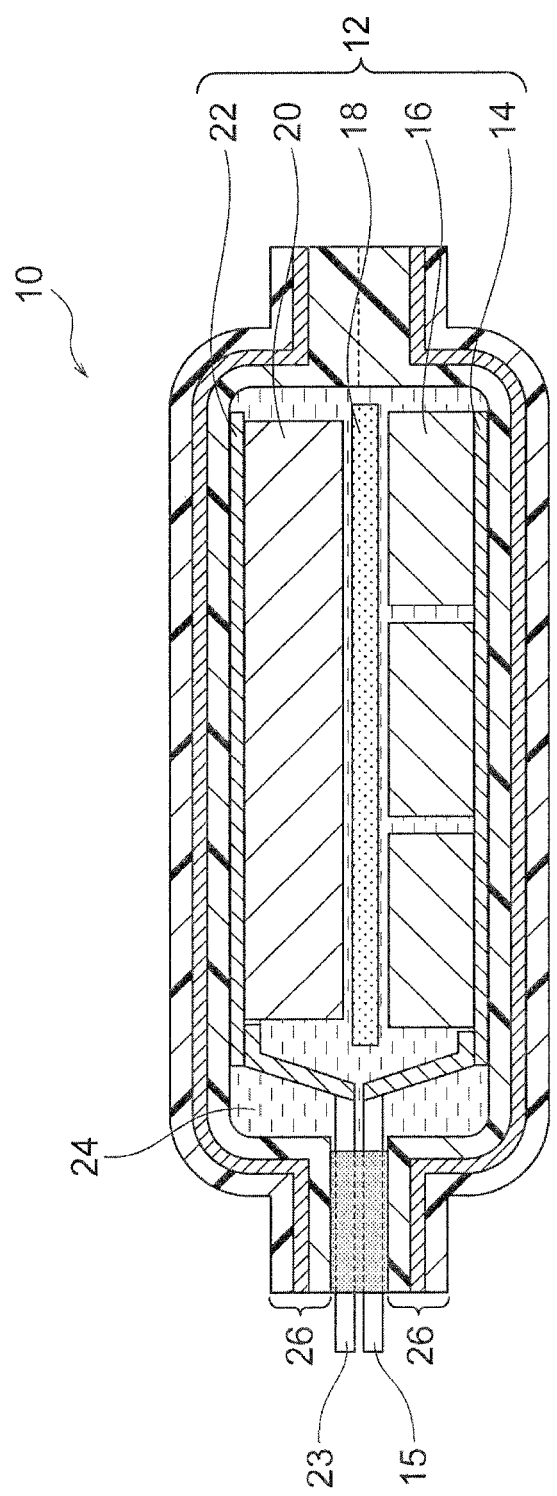
FIG. 1 is a schematic cross-sectional view of an exemplary secondary lithium battery in the present invention.

FIG. 1 schematically illustrates an exemplary secondary lithium battery in the present invention. The secondary lithium battery 10 shown in FIG. 1 includes a positive electrode plate 16, a negative electrode 20, and an electrolytic solution 24. The positive electrode plate 16 is a lithium complex oxide sintered plate. The negative electrode 20 includes carbon and styrene butadiene rubber (SBR). The electrolytic solution 24 contains lithium borofluoride ($LiBF_4$) in a non-aqueous solvent composed of γ-butyrolactone (GBL) and optional ethylene carbonate (EC). As described above, the positive electrode plate 16, which is a lithium complex oxide sintered plate, the negative electrode 20 containing carbon and styrene butadiene rubber (SBR), and the electrolytic solution 24 containing lithium borofluoride ($LiBF_4$) in the non-aqueous solvent composed of γ-butyrolactone (GBL) and optional ethylene carbonate (EC) are selectively combined, thereby a secondary lithium battery having superior heat resistance can be provided. Although multiple pieces of positive electrode plates 16 are shown in FIG. 1, one piece of positive electrode plate 16 that is not divided into multiple pieces may be used in the present invention.

As described above, it is conceivable that hot lamination may be applied to incorporate a thin lithium battery into a low-profile device, such as a smart card, and reflow soldering may be used to mount a thin lithium battery on a printed wiring board. All of these procedures involve heating to a high temperature of 110° C. or higher, and a conventional thin lithium battery with liquid electrolyte has insufficient heat resistance, resulting in swelling, breaking and increase in electrical resistance of the battery when the battery is heated to 110° C. or higher. In contrast, the secondary lithium battery 10 in the present invention has superior heat resistance: Even when heated to 110° C. or higher, the battery does not swell or break and the electrical resistance of the battery does not increase. Such superior heat resistance is provided by selective combination of the specified positive electrode plate 16, negative electrode 20, and electrolytic solution 24 described above.

Accordingly, the secondary lithium battery 10 may be mounted on a substrate through, preferably a process involving heating to 110° C. or higher, more preferably a process involving heating by hot lamination or reflow soldering. In other words, according to another preferred embodiment of the present invention, a method of manufacturing a battery-incorporating device is provided comprising a step of preparing a secondary lithium battery and a step of mounting the secondary lithium battery on a substrate through, preferably a process involving heating to 110° C. or higher, more preferably a process involving heating by hot lamination or reflow soldering. In this embodiment, it is particularly preferred that the process involving heating is hot lamination and the battery-incorporating device is a battery-incorporating smart card. In any embodiment, a heating temperature is preferably 110° C. to less than 260° C., more preferably 110° C. to less than 240° C., further more preferably 110° C. to less than 220° C., particularly more preferably 110° C. to less than 200° C., most preferably 110° C. to less than 150° C.

The positive electrode plate 16 is a lithium complex oxide sintered plate. The phrase "the positive electrode plate 16 is a sintered plate" indicates that the positive electrode plate 16 contains no binder because the binder disappears or burns off during firing even if the green sheet of the positive electrode contains the binder. Containing no binder in the positive electrode plate 16 has an advantage in that deterioration of the positive electrode due to the electrolytic solution can be avoided. For example, as disclosed in PTLs 1, 2, and 4, a binder called polyvinylidene fluoride (PVDF) is widely used for a positive electrode in conventional lithium batteries, and this PVDF is highly soluble in γ-butyrolactone (GBL) used as the electrolytic solution in the present invention, resulting in a loss in function of the binder. In this regard, since the positive electrode plate 16 used in the present invention is a sintered plate containing no binder, the problem as described above does not occur. Particularly preferred lithium complex oxide constituting the sintered plate is lithium cobaltate (typically, $LiCoO_2$ (hereinafter, it may be abbreviated as LCO)). Various lithium complex oxide sintered plates or LCO sintered plates are known. For example, the sintered plate disclosed in PTL 3 (JP5587052B) can be used.

Figure 3:
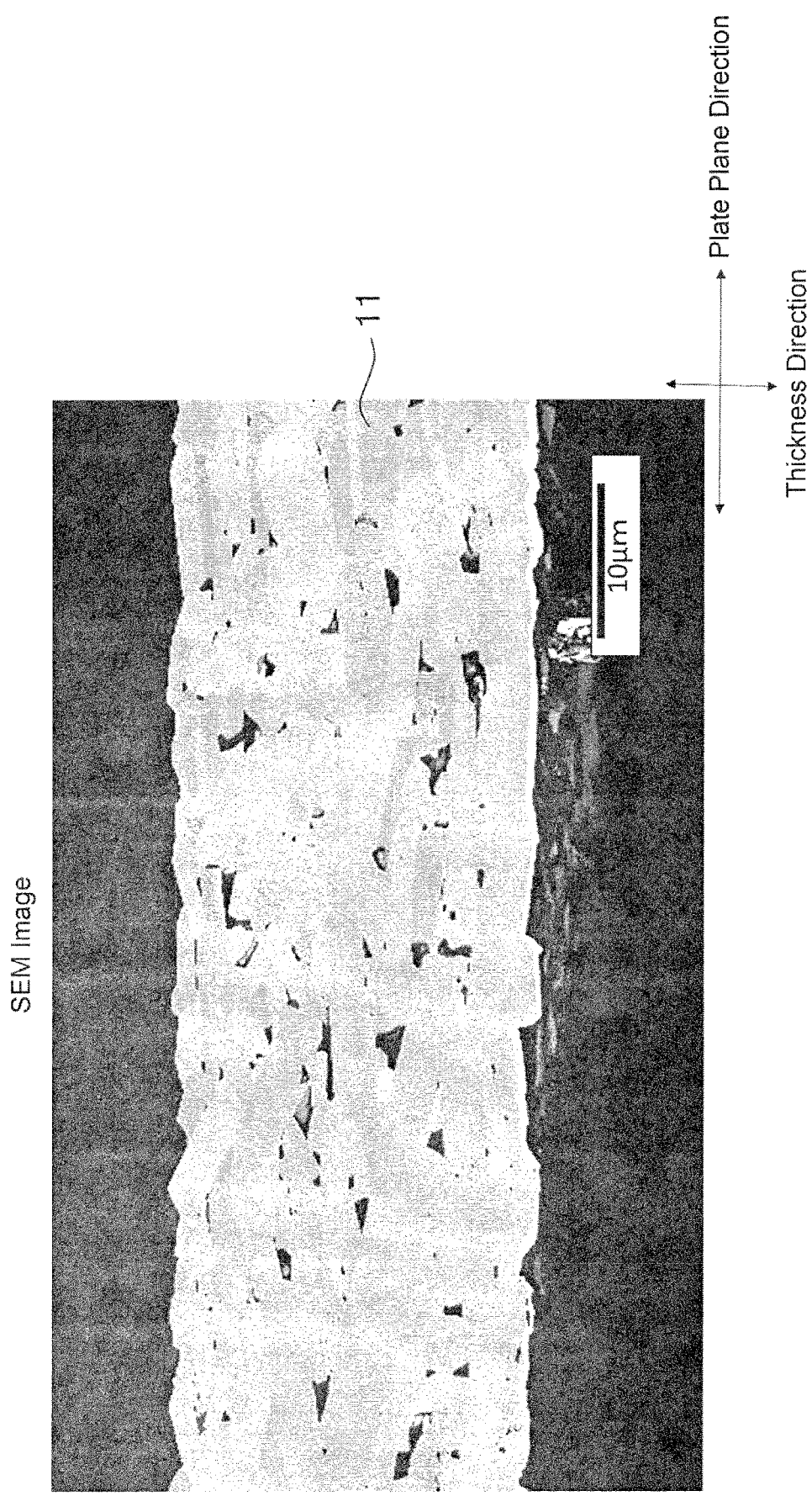
FIG. 3 is an SEM image illustrating an exemplary cross-section perpendicular to a plate face of an oriented positive electrode plate.
Figure 4:
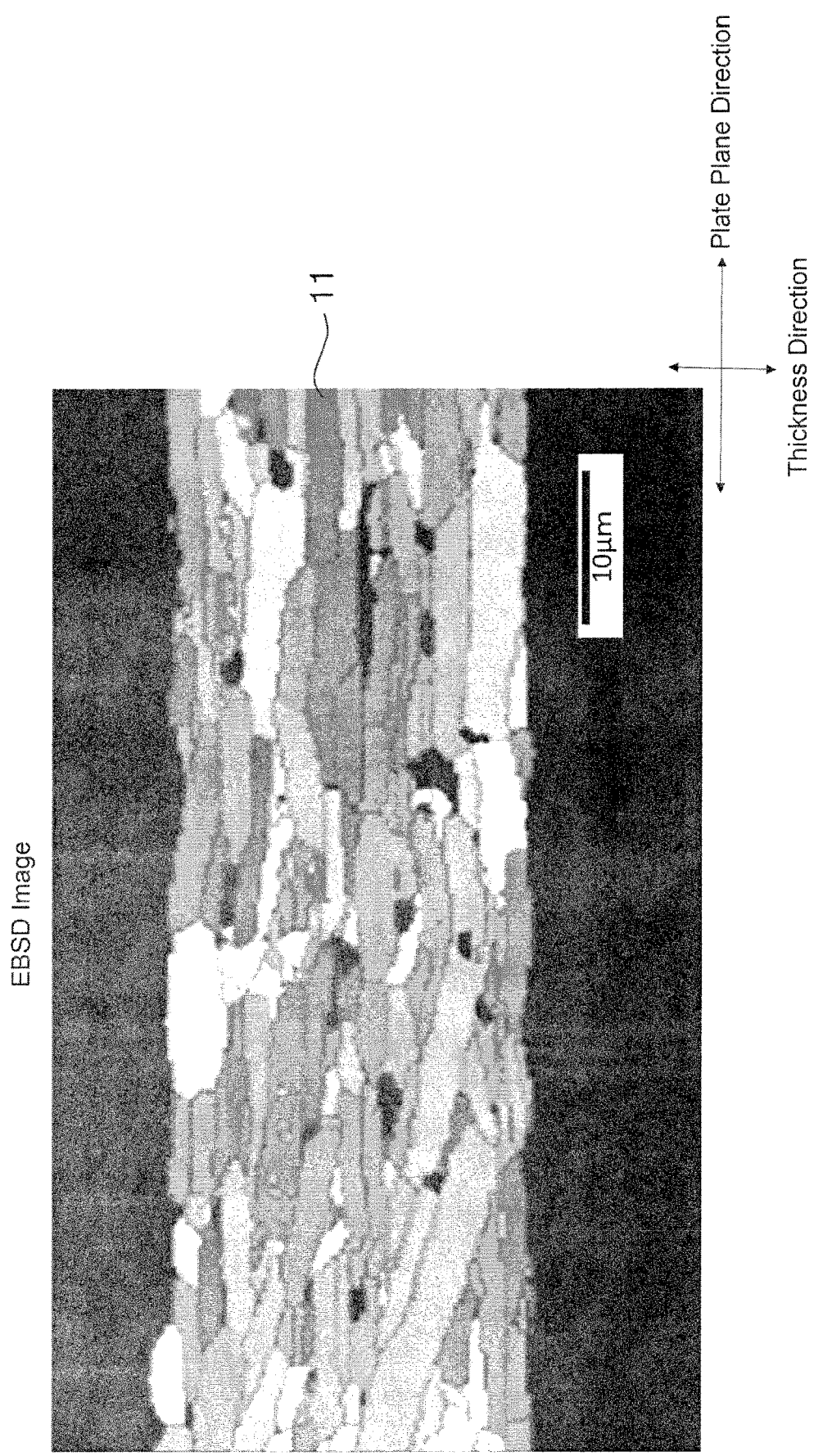
FIG. 4 is an EBSD image of a cross-section of the oriented positive electrode plate shown in FIG. 3.
Figure 5:
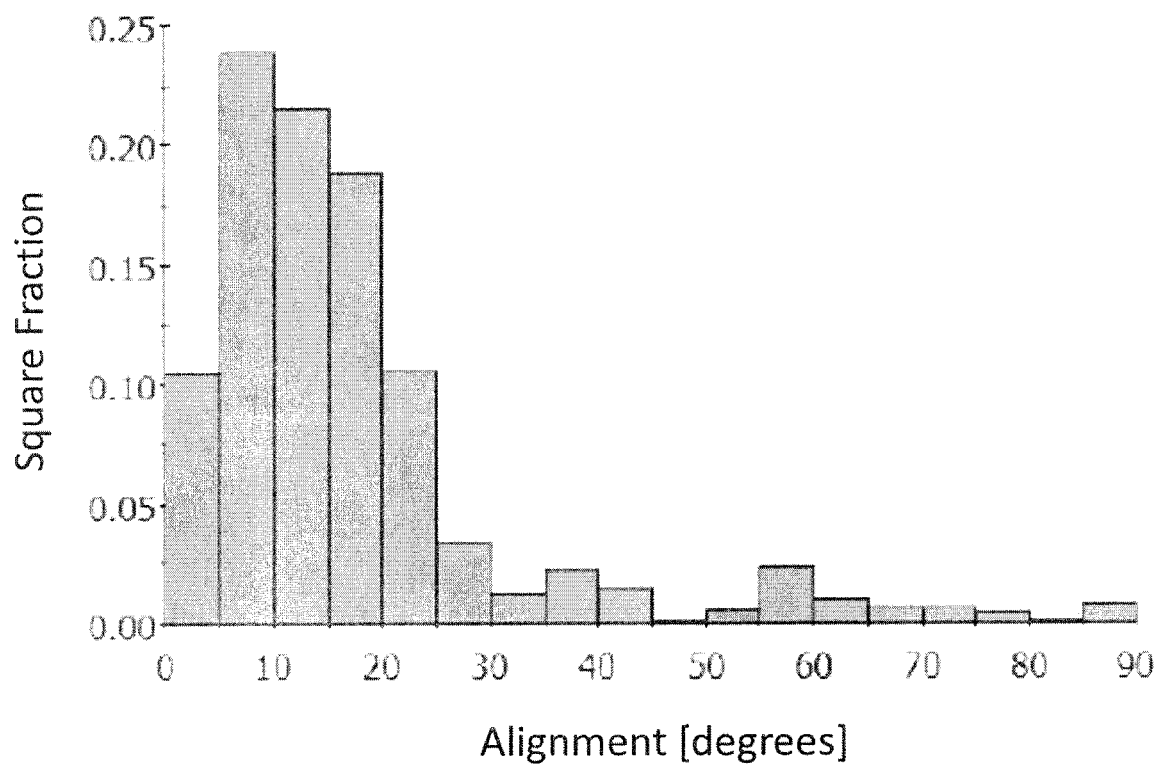
FIG. 5 is an area-based histogram illustrating the distribution of orientation angles of primary grains in the EBSD image of FIG. 4.

According to a preferred embodiment of the present invention, the positive electrode plate 16, i.e, the lithium complex oxide sintered plate, includes a plurality of primary grains composed of lithium complex oxide, and is also an oriented positive electrode plate in which the plurality of primary grains are oriented at a mean orientation angle of more than 0° to 30° to a plate face of the positive electrode plate. FIG. 3 illustrates an example of a cross-sectional SEM image perpendicular to the plate face of the oriented positive electrode plate 16, and FIG. 4 illustrates an electron back-scatter diffraction (EBSD) image on a cross-section perpendicular to the plate face of the oriented positive electrode plate 16. FIG. 5 is an area-based histogram illustrating the distribution of orientation angles of the primary grains 11 in the EBSD image of FIG. 4. In the EBSD image shown in FIG. 4, discontinuity of the crystal orientation can be observed. In FIG. 4, the orientation angle of each primary grain 11 is determined by the shade of color, and a darker shade indicates a smaller orientation angle. The orientation angle is a tilt angle between the (003) plane of each primary grain 11 and a plate face. In FIGS. 3 and 4, black portions inside the oriented positive electrode plate 16 indicate pores.

The oriented positive electrode plate 16 is an oriented sintered plate composed of multiple primary grains 11 bonded to each other. Each primary grain 11 is mainly in a platy shape, and may be formed in, for example, a cuboid shape, a cubic shape, and a spherical shape. The cross-sectional shape of each primary grain 11 may be a rectangle, a polygon other than a rectangle, a circle, an ellipse, or any other complicated shape.

Each primary grain 11 is composed of lithium complex oxide. The lithium complex oxide is an oxide represented by $Li_xMO_2$ ($0.05 < x < 1.10$, M is at least one transition metal, and M typically contains at least one of Co, Ni and Mn). The lithium complex oxide has a layered rock salt structure. The layered rock salt structure is a crystal structure in which a lithium layer and a transition metal layer other than lithium are alternately stacked with an oxygen layer therebetween, i.e., a crystal structure in which a transition metal ion layer and a lithium single layer are alternately stacked with oxide ions therebetween (typically an $\alpha$-$NaFeO_2$ structure, i.e., a structure in which transition metals and lithium metals are regularly disposed along the [111] axis of a cubic rock salt structure). Examples of lithium complex oxides include $LixCoO_2$ (lithium cobaltate), $LixNiO_2$ (lithium nickelate), $LixMnO_2$ (lithium manganate), $LixNiMnO_2$ (lithium nickel manganate), $LixNiCoO_2$ (lithium nickel cobaltate), $LixCoNiMnO_2$ (lithium cobalt nickel manganate), $LixCoMnO_2$ (lithium cobalt manganate), and particularly preferably, $LixCoO_2$ (lithium cobaltate, typically $LiCoO_2$). The lithium complex oxide may contain at least one element selected from Mg, Al, Si, Ca, Ti, V, Cr, Fe, Cu, Zn, Ga, Ge, Sr, Y, Zr, Nb, Mo, Ag, Sn, Sb, Te, Ba., Bi, and W.

As shown in FIGS. 4 and 5, a mean value of the orientation angles of primary grains 11, i.e., a mean orientation angle, is more than 0° to 30°. This angle range provides the following various advantages. Since each primary grain 11 greatly tilts from the thickness direction of the positive electrode plate, the adhesiveness between the individual primary grains can be improved. Due to this configuration, the lithium ion conductivity between one primary grain 11 and another primary grain 11 adjacent on two ends of the one primary grain 11 in the longitudinal direction can be improved, resulting in an improvement in high rate property. In addition, the high rate property can be further improved. This further improvement is caused by smooth intercalation/deintercalation of lithium ions in the oriented positive electrode 16, because expansion and contraction of the oriented positive electrode plate 16 proceeds more dominantly in the thickness direction than in the plate face direction and thereby lithium ions can intercalate and deintercalate smoothly.

The mean orientation angle of the primary grains 11 is determined by the following procedure. As shown in FIG. 4, three horizontal lines which divide the oriented positive electrode plate 16 into four equal intervals in the plate thickness direction, and three vertical lines that divide it into four equal intervals in the plate face direction are drawn in an EBSD image that illustrates a 95 μm by 125 μm rectangular area observed at 1000-fold magnification. The mean orientation angle of the primary grains 11 is determined by arithmetically averaging the orientation angles of all the primary grains 11 that intersect at least one of the three horizontal lines and the three vertical lines. The mean orientation angle of the primary grains 11 is preferably 30° or less, and more preferably 25° or less from the viewpoint of a further improvement in high rate property. The mean orientation angle of the primary grains 11 is preferably 2° or more, and more preferably 5° or more from the viewpoint of a further improvement in high rate property.

As shown in FIG. 5, the orientation angle of each primary grain 11 may be widely distributed from 0° to 90°, and most of the orientation angles are preferably distributed in a region of more than 0° to 30°. In other words, when the cross-section of the oriented sintered plate constituting the oriented positive electrode plate 16 is analyzed in the EBSD image, the total area of primary grains 11 that have the orientation angle of more than 0° to 30° to the plate face of the oriented positive electrode plate 16 (hereinafter, referred to as low-angle primary grains) is preferably 70% or more, and more preferably 80% or more of the total area of the primary grains 11 (specifically, 30 primary grains 11 used in calculation of the mean orientation angle) included in the cross-section. This configuration can increase the proportion of the primary grains 11 having higher mutual adhesiveness, thereby high rate property can be further improved. In addition, the total area of the low-angle primary grains having an orientation angle of 20° or less is more preferably 50% or more of the total area of the 30 primary grains 11 used in the calculation of the mean orientation angle. Furthermore, the total area of the low-angle primary grains having an orientation angle of 10° or less is more preferably 15% or more of the total area of the 30 primary grains 11 used in the calculation of the mean orientation angle.

Since each primary grain 11 is mainly platy, the cross-section of each primary grain 11 respectively extends in a predetermined direction as shown in FIGS. 3 and 4, and typically has a substantially rectangular shape. In other words, when the cross-section of the oriented sintered plate is analyzed in the EBSD image, the total area of primary grains 11 that have an aspect ratio of 4 or more among the primary grains 11 included in the analyzed cross-section is preferably 70% or more, and more preferably 80% or more of the total area of the primary grains 11 (specifically, 30 primary grains 11 used in calculation of the mean orientation angle) included in the cross-section. In detail, the configuration shown in the EBSD image of FIG. 4 can increase the mutual adhesiveness between the primary grains 11, resulting in a further improvement of high rate property. The aspect ratio of the primary grains 11 is a value determined by dividing the maximum Feret diameter by the minimum Feret diameter of the primary grains 11. The maximum Feret diameter is the maximum distance between two parallel straight lines by which the primary grains 11 are sandwiched in the EBSD image from cross-sectional observation. The minimum Feret diameter is the minimum distance between two parallel straight lines by which the primary grains 11 are sandwiched.

A plurality of primary grains constituting the oriented sintered plate preferably has a mean primary grain diameter of 5 μm or more. Specifically, the 30 primary grains 11 used in the calculation of the mean orientation angle has a mean grain diameter of preferably 5 μm or more, more preferably 7 μm or more, and further more preferably 12 μm or more. The number of grain boundaries between the primary grains 11 thereby decreases in the direction where lithium ions are conducted, resulting in an increase in overall lithium ion conductivity and thus a further improvement in high rate property. The mean grain diameter of the primary grains 11 is a value determined by arithmetically averaging equivalent circle diameters of respective primary grains 11. The equivalent circle diameter indicates the diameter of a circle having the same area as each primary grain 11 in the EBSD image.

The compactness of the oriented sintered plate constituting the oriented positive electrode plate 16 is preferably 70% or more, more preferably 80% or more, further more preferably 90% or more. The mutual adhesiveness thereby increases between the primary grains 11, resulting in a further improvement in high rate property. The compactness of the oriented sintered plate can be calculated by binarizing the SEM image resultant from the observation with a SEM at 1000-fold magnification after polishing of the cross-section of the positive electrode plate with a cross-section polisher (CP). The mean equivalent circle diameter of pores formed inside the oriented sintered plate may be preferably 8 μm or less.

Smaller mean equivalent circle diameter of pores can further increase the mutual adhesiveness between the primary grains 11, resulting in a further improvement in high rate property. The mean equivalent circle diameter of pores is a value determined by arithmetically averaging equivalent circle diameters of 10 pores in the EBSD image. The equivalent circle diameter indicates the diameter of a circle having an area that is the same as that of each pore in the EBSD image. Each pore formed inside the oriented sintered plate may be an open pore connected to the outside of the oriented positive electrode plate 16, although each pore does not preferably penetrate the oriented positive electrode plate 16 and thereby may be a closed pore.

The oriented positive electrode plate 16 has a thickness of preferably 30 μm or more, more preferably 40 μm or more, particularly more preferably 50 μm or more, most preferably 55 μm or more from the viewpoint of an increase in the active material capacity per unit area and an improvement in energy density of the secondary lithium battery 10. Although the upper limit of the thickness is not particularly limited, the oriented positive electrode plate 16 has a thickness of preferably less than 200 μm, more preferably 150 μm or less, further more preferably 120 μm or less, particularly more preferably 100 μm or less, most preferably 90 μm or less, 80 μm or less, or 70 μm or less from the viewpoint of restraint in deterioration of battery properties due to repeated charge/discharge cycles (particularly, due to an increase in electrical resistance). In addition, the oriented positive electrode plate has a dimension of preferably 5 mm by 5 mm square or more, more preferably 10 mm by 10 mm to 200 mm by 200 mm square, further more preferably 10 mm by 10 mm to 100 mm by 100 mm square. In another expression, the oriented positive electrode plate has a dimension of preferably at least 25 mm$^2$, more preferably 100 to 40,000 mm$^2$, further more preferably 100 to 10,000 mm$^2$.

The negative electrode 20 includes carbon and styrene butadiene rubber (SBR). In detail, the carbon is a negative electrode active material, and the SBR is a binder. Examples of carbon include graphite, pyrolytic carbon, coke, fired resin, small mesophase spheres, and mesophase pitch, and preferred carbon is graphite. The graphite may be any of natural graphite and artificial graphite. Containing styrene butadiene rubber (SBR), which is a binder, in the negative electrode 20 is advantageous in avoiding deterioration of the negative electrode due to the electrolytic solution. For example, as disclosed in PTL 4, a binder called polyvinylidene fluoride (PVDF) is widely used in a negative electrode of a conventional lithium battery, and this PVDF is greatly soluble in γ-butyrolactone (GBL) used in the present invention and loses its function as a binder. In this regard, since the styrene butadiene rubber (SBR) barely soluble in GBL is selectively applied in the negative electrode 20 used in the present invention, the problem as described above does not occur. Accordingly, the negative electrode 20 preferably contains no binder other than SBR (e.g., PVDF).

The electrolytic solution 24 is a non-aqueous solvent that contains lithium borofluoride (LiBF$_4$). The non-aqueous solvent may be a single solvent composed of γ-butyrolactone (GBL) or a mixed solvent composed of γ-butyrolactone (GBL) and ethylene carbonate (EC). Since the non-aqueous solvent contains γ-butyrolactone (GBL), the boiling point is increased, and the heat resistance is greatly improved. From this viewpoint, the ratio by volume of EC:GBL in the non-aqueous solvent is preferably 0:1 to 1:1 (GBL ratio of 50 to 100% by volume), more preferably 0:1 to 1:1.5 (GBL ratio of 60 to 100% by volume), more preferably 0:1 to 1:2 (GBL ratio of 66.6 to 100% by volume), particularly more preferably 0:1 to 1:3 (GBL ratio of 75 to 100% by volume). Lithium borofluoride (LiBF$_4$) dissolved in a non-aqueous solvent is an electrolyte having high decomposition temperature, and also results in a significant improvement in heat resistance. The electrolytic solution 24 has a LiBF$_4$ concentration of preferably 0.5 to 2 mol/L, more preferably 0.6 to 1.9 mol/L, further more preferably 0.7 to 1.7 mol/L, particularly more preferably 0.8 to 1.5 mol/L.

The electrolytic solution 24 further preferably contains vinylene carbonate (VC), and/or fluoroethylene carbonate (FEC) and/or vinyl ethylene carbonate (VEC) as an additive. VC and FEC each have superior heat resistance. Further addition of such an additive into the electrolytic solution 24 can form an SEI film having superior heat resistance on the surface of the negative electrode 20, resulting in a further improvement in heat resistance of the secondary lithium battery 10.

The secondary lithium battery 10 is further preferably provided with a separator 18. The separator 18 is composed of preferably polyimide, polyester (e.g., polyethylene terephthalate (PET)) or cellulose, and more preferably polyimide. A separator composed of polyimide, polyester (e.g., polyethylene terephthalate (PET)) or cellulose has not only superior heat resistance as its own property, but high wettability to γ-butyrolactone (GBL) different from a separator composed of polyolefin, such as polypropylene (PP) and polyethylene (PE), that is widely used and has inferior heat resistance. The electrolytic solution 24 containing GBL can thus sufficiently penetrate (without being repelled) into the separator 18. As a result, the heat resistance of the secondary lithium battery 10 can be further improved. A particularly preferred separator is composed of polyimide. Polyimide separators are commercially available and have a greatly complicated microstructure, and thereby have an advantage in more effective prevention or delaying of the growth of dendritic lithium deposited during overcharge and thus short circuiting. In contrast, cellulose separators are advantageous in less expensiveness than the polyimide separators.

The secondary lithium battery 10 has a thickness of preferably 0.45 mm or less, more preferably 0.1 to 0.45 mm, further more preferably 0.2 to 0.45 mm, particularly more preferably 0.3 to 0.40 mm. Such thickness ranges can cause a thin lithium battery suitable for being incorporated into a low-profile device, such as a smart card.

As shown in FIG. 1, cell unit 12 and the electrolytic solution 24, which are components of the secondary lithium battery 10, are preferably wrapped and sealed with packaging films 26. In other words, the secondary lithium battery 10 is preferably in the form of a so-called film-packed battery. In this battery, the cell unit 12 each includes a positive electrode plate 16, a separator 18, and a negative electrode 20, and typically further includes a positive electrode collector 14 and a negative electrode collector 22. The positive electrode collector 14 and the negative electrode collector 22 may be composed of any material, preferably copper foil. The positive electrode collector 14 is preferably provided with a positive electrode terminal 15 extending from the positive electrode collector 14, and the negative electrode collector 22 is preferably provided with a negative electrode terminal 23 extending from the negative electrode collector 22. In FIG. 1, the secondary lithium battery 10 is illustrated as being a layered structure and a sealed structure having a certain amount of space to clearly show the existence of the electrolytic solution 24, however such a space is desired to be minimized in an actual battery. The outer edges of the secondary lithium battery 10 are sealed by thermal bonding of the packaging films 26 to each other. Sealing by thermal bonding is preferably performed with a heat bar (also referred to as a heating bar) generally used in heat sealing.

The packaging film 26 may be a commercially available packaging film. The packaging film 26 has a thickness of preferably 20 to 160 μm, more preferably 40 to 120 μm, further more preferably 40 to 65 μm. The packaging film 26 is preferably a laminated film including a resin film and a metal foil, more preferably an aluminum-laminated film including a resin film and an aluminum foil. The laminated film is preferably provided with resin films on two faces of the metal foil, such as the aluminum foil. In this case, it is preferred that a resin film on one face of the metal foil (hereinafter, referred to as a surface protective film) be composed of a material having high reinforcing properties, such as nylon, polyamide, poly(ethylene terephthalate), polyimide, polytetrafluoroethylene, and polychlorotrifluoroethylene, and a resin film on the other face of the metal foil (hereinafter, referred to as a sealing resin film) be composed of a heat sealing material, such as polypropylene. Aluminum-laminated films having such a layer structure composed of a surface protective film/an aluminum foil/a sealing resin film are commercially available for lithium batteries, and most of the sealing resin films in the commercially available aluminum-laminated film have a two-layer structure of polypropylene resin. In general, this two-layer structure is composed of a main layer having a softening point of 150 to 160° C. and an adhesive layer having a softening point of 130 to 140 ° C. disposed on the outside of the main layer. However, since the adhesive layer having a softening point of 130 to 140° C. has a lower softening point than the main layer, the adhesive layer can be readily softened or fluidized by heating, resulting in poor heat resistance. Accordingly, from the viewpoint of an increase in heat resistance of the secondary lithium battery 10, the following improvement a) or b) preferably should be achieved on the sealing resin film having the two-layer structure of polypropylene resin.

a) A single-layer sealing resin film having only a main layer without an adhesive layer is used. This single-layer structure does not include an adhesive layer having a softening point of 130 to 140° C., thereby improving heat resistance. In this case, the main layer having a softening point of 150 to 160° C. also serves as the adhesive layer.

b) A heat-resistant polypropylene film having a higher softening temperature is used as a main layer without use of an adhesive layer. A known heat-resistant polypropylene film has a high softening temperature of 160 to 170° C., and a single-layer structure of such a heat-resistant polypropylene film is used as the sealing resin film, thereby achieving the highest level of heat resistance among the polypropylene films.

In order to prevent the packaging film 26 from being broken in a hot-pressing process, such as hot lamination, at least one end of the positive electrode collector 14, the positive electrode terminal 15, the negative electrode collector 22, and the negative electrode terminal 23 may be covered with a protective tape. The covering can effectively prevent the breakage of the packaging film 26 due to burrs that may be formed at the edge of the cell unit. Preferred examples of the protective tape include a polyimide tape because of its superior heat resistance.

Process for Producing Oriented Lithium Cobaltate Sintered Plate

An oriented positive electrode plate or an oriented sintered plate preferably used in the secondary lithium battery of the present invention may be produced by any process, although preferably produced through the following steps: (1) preparation of $LiCoO_2$ template grains, (2) preparation of matrix grains, (3) preparation of green sheet, and (4) production of oriented sintered plate.

(1) Preparation of $LiCoO_2$ Template Grains $Co_3O_4$ raw material powder and $Li_2CO_3$ raw material powder are mixed. The mixed powder is fired at 500 to 900° C. for 1 to 20 hours to synthesize $LiCoO_2$ powder. The resultant $LiCoO_2$ powder is pulverized in a pot mill into a volume-based D50 grain diameter of 0.1 to 10 μm to give platy $LiCoO_2$ grains capable of conducting lithium ions parallel to the plate face. The resultant platy $LiCoO_2$ grains are in a state of being readily cleaved along cleavage planes. The $LiCoO_2$ grains are cleaved by disintegration to produce $LiCoO_2$ template grains. Such $LiCoO_2$ grains may also be produced through several processes, such as a disintegration process after the grain growth in a green sheet prepared from $LiCoO_2$ powder slurry, a flux process, a hydrothermal synthesis process, a single-crystal growth process using a melt, and a sol-gel process.

In this step, the profile of primary grains 11 constituting the oriented positive electrode plate 16 can be controlled as follows.

Adjustment of at least one of the aspect ratio and the grain diameter of $LiCoO_2$ template grains can control the total area rate of the low-angle primary grains having an orientation angle of more than 0° to 30°. Specifically, a higher aspect ratio of $LiCoO_2$ template grains and a larger grain diameter of $LiCoO_2$ template grains can increase the total area rate of the low-angle primary grains. The aspect ratio and the grain diameter of the $LiCoO_2$ template grains, respectively, can be controlled by adjustment of at least one of the grain diameters of the $Co_3O_4$ raw material powder and the $Li_2CO_3$ raw material powder, pulverization conditions (e.g., pulverizing time, pulverizing energy, and pulverizing procedure), and classification conditions after the pulverization.

Adjustment of the aspect ratio of $LiCoO_2$ template grains can control the total area rate of the primary grains 11 having an aspect ratio of 4 or more. Specifically, higher aspect ratio of $LiCoO_2$ template grains can increase the total area rate of the primary grains 11 having an aspect ratio of 4 or more. The procedures of adjusting the aspect ratio of the $LiCoO_2$ template grains are as described above.

Adjustment of the grain diameter of $LiCoO_2$ template grains can control a mean grain diameter of the primary grains 11.

Adjustment of the grain diameter of $LiCoO_2$ template grains can control the compactness of the oriented positive electrode plate 16. Specifically, smaller grain diameter of the LiCoO$_2$ template grains can increase the compactness of the oriented positive electrode plate 16.

(2) Preparation of Matrix Grains

Co$_3$O$_4$ raw material powder is used as matrix grains. The Co$_3$O$_4$ raw material powder may have any volume-based D50 grain diameter, for example, 0.1 to 1.0 μm, and is preferably smaller than the volume-based D50 grain diameter of the LiCoO$_2$ template grains. The matrix grains can also be prepared through heat treatment of Co(OH)$_2$ raw material at 500 to 800° C. for 1 to 10 hours. Co(OH)$_2$ grains or LiCoO$_2$ grains other than Co$_3$O$_4$ are used as the matrix grains.

In this step, the profile of primary grains 11 constituting the oriented positive electrode plate 16 can be controlled as follows.

Adjustment of the ratio of the grain diameter of matrix grains to the grain diameter of LiCoO$_2$ template grains (hereinafter, referred to as "matrix/template grain diameter ratio") can control the total area rate of the low-angle primary grains having an orientation angle of more than 0° to 30°. Specifically, smaller matrix/template grain diameter ratio, i.e., smaller grain diameter of the matrix grains, can more readily incorporate the matrix grains into the LiCoO$_2$ template grain in a firing step described later, resulting in higher total area rate of the low-angle primary grains.

Adjustment of the matrix/template grain diameter ratio can control the total area rate of the primary grains 11 having an aspect ratio of 4 or more. Specifically, smaller matrix/template grain diameter ratio, i.e., smaller grain diameter of the matrix grains, can increase the total area rate of the primary grains 11 having an aspect ratio of 4 or more.

Adjustment of the matrix/template grain diameter ratio can control the compactness of the oriented positive electrode plate 16. Specifically, smaller matrix/template grain diameter ratio, i.e., smaller grain diameter of the matrix grains, can increase the compactness of the oriented positive electrode plate 16.

(3) Preparation of Green Sheet

LiCoO$_2$ template grains and matrix grains are mixed in a ratio of 100:3 to 3:97 to give a mixed powder. The mixed powder, a dispersion medium, a binder, a plasticizer, and a dispersant are stirred and defoamed under reduced pressure while mixing to prepare a slurry having a desired viscosity. The resultant slurry is then formed into a shaped material using a molding procedure capable of applying a shear force to the LiCoO$_2$ template grains. Through these steps, each primary grain 11 can be aligned to have a mean orientation angle of more than 0° to 30°. The molding procedure capable of applying a shear force to the LiCoO$_2$ template grains is preferably a doctor blade process. In the doctor blade process, the resultant slurry is formed on a PET film to prepare the shaped material, i.e., a green sheet.

In this step, the profile of primary grains 11 constituting the oriented positive electrode plate 16 can be controlled as follows.

Adjustment of the shaping rate can control the total area rate of the low-angle primary grains having an orientation angle of more than 0° to 30°. Specifically, a higher shaping rate can increase the total area rate of the low-angle primary grains.

Adjustment of the density in the shaped material can control the mean grain diameter of the primary grains 11. Specifically, larger density in the shaped material can increase the mean grain diameter of the primary grains 11.

Adjustment of a mixing ratio between the LiCoO$_2$ template grains and the matrix grains can also control the compactness of the oriented positive electrode plate 16. Specifically, a larger amount of LiCoO$_2$ template grains can reduce the compactness of the oriented positive electrode plate 16.

(4) Production of Oriented Sintered Plate

The shaped material prepared from the slurry is placed on a zirconia setter and heated at 500 to 900° C. for 1 to 10 hours (primary firing) to give a sintered plate as an intermediate. This sintered plate is sandwiched between lithium-containing sheets (e.g., Li$_2$CO$_3$-containing sheets), placed on a zirconia setter, and heated (secondary firing) to prepare a LiCoO$_2$ sintered plate. In detail, a setter on which a sintered plate sandwiched between lithium-containing sheets is placed is disposed in an alumina sheath and fired at 700 to 850° C. for 1 to 20 hours in the air, and then the resultant sintered plate is further sandwiched between lithium-containing sheets and fired at 750 to 900° C. for 1 to 40 hours to produce a LiCoO$_2$ sintered plate. This firing step may be performed in two separate stages or in one stage. In a two-stage firing process, the firing temperature in the first stage is preferably lower than that in the second stage. The total amount of the lithium-containing sheet used in the secondary firing may be selected such that Li/Co ratio is 1.0, the Li/Co ratio being the molar ratio of Li content in the green sheet and the lithium-containing sheet to Co content in the green sheet.

In this step, the profile of primary grains 11 constituting the oriented positive electrode plate 16 can be controlled as follows.

Adjustment of a heating rate during firing can control the total area rate of the low-angle primary grains having an orientation angle of more than 0° to 30°. Specifically, a higher heating rate can restrain the sintering between the matrix grains, and thereby increase the total area rate of the low-angle primary grains.

Adjustment of a heating temperature for the intermediate can also control the total area rate of the low-angle primary grains having an orientation angle of more than 0° to 30°. Specifically, a lower heating temperature for the intermediate can restrain the sintering between the matrix grains, and thereby increase the total area rate of the low-angle primary grains.

Adjustment of at least one of the heating rate during firing and the heating temperature for the intermediate can control a mean grain diameter of the primary grains 11. Specifically, a higher heating rate or lower heating temperature for the intermediate can increase the mean grain diameter of the primary grains 11.

Adjustment of at least one of the amount of lithium (e.g., Li$_2$CO$_3$) and the amount of a sintering aid (e.g., boric acid or bismuth oxide) during firing can also control a mean grain diameter of the primary grains 11. Specifically, more amount of lithium or more amount of the sintering aid can increase the mean grain diameter of the primary grains 11.

Adjustment of heating profile during firing can control the compactness of the oriented positive electrode plate 16. Specifically, lower heating rate or longer firing time can increase the compactness of the oriented positive electrode plate 16.

EXAMPLES

The present invention will be described in more detail by the following examples.

Example A1

(1) Preparation of Secondary Lithium Battery

Figure 2A:
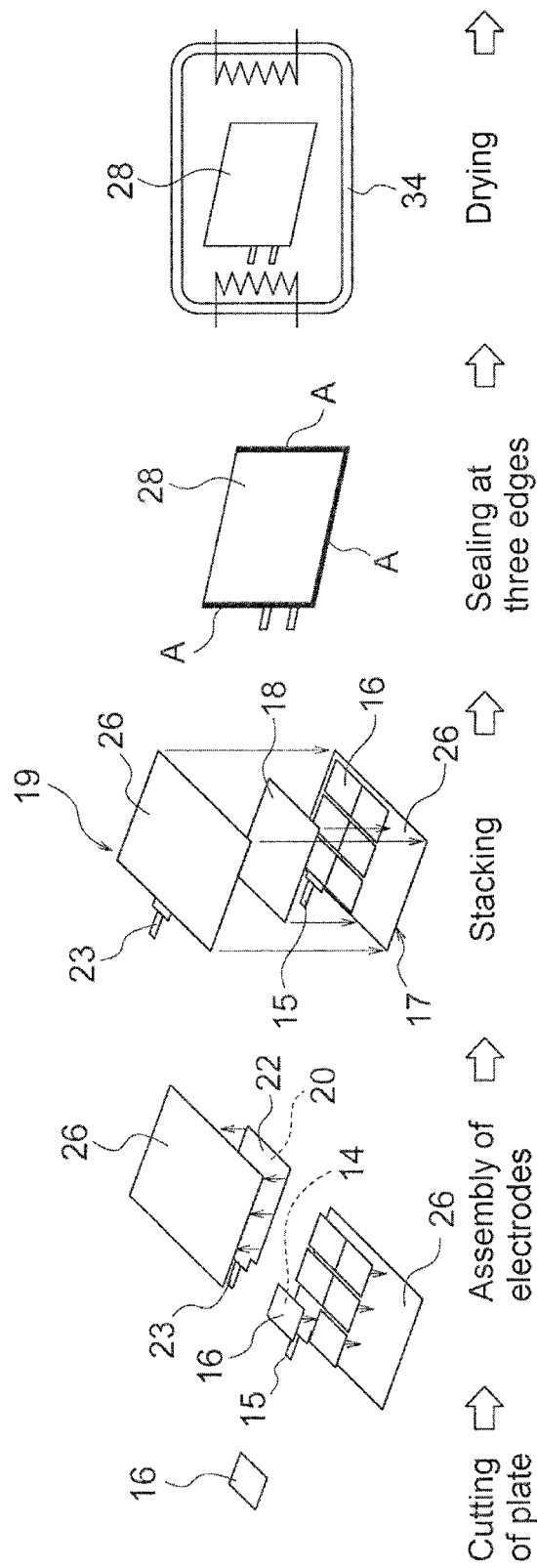
FIG. 2A is a view illustrating the former steps of an exemplary manufacturing process of a secondary lithium battery.
Figure 2B:
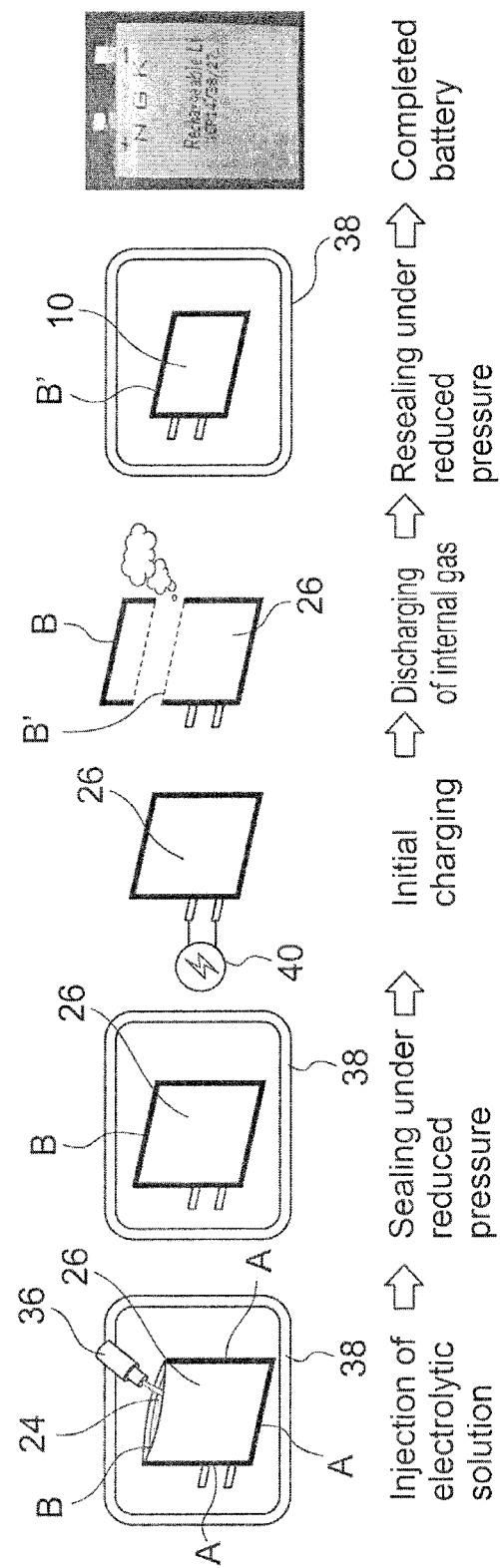
FIG. 2B is a view illustrating the latter steps of an exemplary manufacturing process of a secondary lithium battery subsequent to the steps illustrated in FIG. 2A. The right end of FIG. 2B includes a photograph of a film-packed battery.

A secondary lithium battery 10 in the form of a film-packed battery schematically shown in FIG. 1 was produced by the procedures as shown in FIGS. 2A and 2B. The details are as follows:

A 90 μm-thick $LiCoO_2$ sintered plate (hereinafter referred to as an LCO sintered plate) was provided. The LCO sintered plate was manufactured in accordance with the method described above for manufacturing a lithium complex oxide sintered plate, and satisfied several preferred conditions for the lithium complex oxide sintered plate as described above. The sintered plate was cut with a laser processing tool into multiple positive electrode plates 16 each being a square of 10 mm by 10 mm.

Two aluminum-laminated films (manufactured by Showa Denko Packaging Co., Ltd., a thickness of 61 μm, three-layer structure composed of a polypropylene film/an aluminum foil/a nylon film) were provided as packaging films 26. As shown in FIG. 2A, multiple positive electrode plates 16 were laterally disposed on one packaging film 26 with a positive electrode collector 14 (a copper foil having a thickness of 9 μm) therebetween to give a positive electrode assembly 17. In this assembly, the positive electrode collector 14 was fixed to one packaging film 26 with an adhesive. The positive electrode collector 14 was provided with a positive electrode terminal 15 welded to and extending from the positive electrode collector 14. In contrast, a negative electrode 20 (a carbon layer having a thickness of 130 μm) was disposed on the other packaging film 26 with a negative electrode collector 22 (a copper foil having a thickness of 10 μm) therebetween to give a negative electrode assembly 19. In this assembly, the negative electrode collector 22 was fixed to the packaging film 26 with an adhesive. The negative electrode collector 22 was provided with a negative electrode terminal 23 welded to and extending from the negative electrode collector 22. In addition, as shown in Table 1, the carbon layer, which is the negative electrode 20, was in the form of a coated layer containing a mixture of graphite as an active material and styrene butadiene rubber (SBR) as a binder.

A porous polyimide film (manufactured by Tokyo Ohka Kogyo Co., Ltd., a thickness of 23 μm, a porosity of 80%) was provided as a separator 18. As shown in FIG. 2A, the positive electrode assembly 17, the separator 18, and the negative electrode assembly 19 are stacked in sequence such that the positive electrode plate 16 and the negative electrode 20 face the separator 18 to produce a laminate 28 in which two outer surfaces were covered with packaging films 26 and the outer periphery of the packaging films 26 protruded from the outer edge of the cell unit 12. The cell unit 12 (the positive electrode collector 14, the positive electrode plate 16, the separator 18, the negative electrode 20, and the negative electrode collector 22) constructed in the laminate 28 had a thickness of 0.33 mm, and a rectangular shape with dimensions of 2.3 cm by 3.2 cm.

As shown in FIG. 2A, three edges A of the resultant laminate 28 were sealed. This sealing was performed by hot pressing of the outer periphery of the laminate 28 at 200° C. and 1.5 MPa for 10 seconds and thermal fusion bonding of the packaging films 26 (aluminum-laminated films) to each other at the outer periphery. After sealing of the three edges A, the laminate 28 was placed in a vacuum dryer 34 to remove moisture and dry the adhesive.

As shown in FIG. 2B, the laminate was transferred into a glove box 38, and a gap was formed between a pair of packaging films 26 at one unsealed edge B remained in the laminate 28 in which the three edges A were sealed. An electrolytic solution 24 was injected from an injector 36 into the gap, and the edge B was then temporarily sealed with a simple sealer under a reduced pressure of 5 kPa. The electrolytic solution was prepared by dissolution of $LiBF_4$ in a concentration of 1.5 mol/L into a mixed solvent containing ethylene carbonate (EC) and γ-butyrolactone (GBL) in a ratio of 1:3 (by volume). The laminate having the edge B temporarily sealed as described above was subjected to initial charging and aging for seven days. After these procedures, an outer periphery (an end not including the cell unit) of the edge B sealed was cut off, and internal gas was discharged.

As shown in FIG. 2B, a fresh edge B' formed by cutting off of the temporary sealed portion was sealed under a reduced pressure of 5 kPa in the glove box 38. This sealing was also performed by hot pressing of the outer periphery of the laminate 28 at 200° C. and 1.5 MPa for 10 seconds and thermal fusion bonding of the packging films 26 (aluminum-laminated films) to each oher at the outer periphery. As described above, the edge B' was sealed between a pair of packaging films 26 to produce a secondary lithium battery 10 in the form of a film-packed battery. The secondary lithium battery 10 was retrieved from the glove box 38, and unnecessary portions on the outer periphery of the packaging film 26 were trimmed away to fix the shape as the secondary lithium battery 10. The secondary lithium battery 10 was completed in which the four outer edges of the cell unit 12 were sealed between a pair of packaging films 26 and the electrolytic solution 24 was injected. The resultant secondary lithium battery 10 was in a rectangular shape having dimensions of 38 mm by 27 mm, and had a thickness of 0.45 mm or less and a capacity of 30 mAh.

(2) Evaluation

The lithium secondary batteries prepared were heated at various temperatures (20° C., 100° C., 110° C., 120° C., or 150° C.) shown in FIG. 1 for 30 minutes and pressed at a pressure of 0.7 MPa in a hot press system, and the following properties were then evaluated.

<Appearance of Battery>

The heated lithium secondary batteries were visually observed to determine whether any change occurred in appearance of the battery. As shown in Table 1A, no change in appearance of the battery is observed at all the heating temperatures.

<Electrical Resistance of Battery>

The Electrical resistance of each heated secondary lithium battery was measured by an AC impedance method using an electrochemical measurement system SP-150 manufactured by BioLogic Science Instruments. The electrical resistance measured was calculated as a relative value where the resistance of the battery heated at 20° C. was 1. The results are shown in Table 1A. No change in electrical resistance is observed in the batteries heated at all the temperatures compared with the battery heated at 20° C.

Example A2 (Comparative)

Batteries were prepared and evaluated as in Example A1 except that a) a coated layer of a mixture of $LiCoO_2$ powder and polyvinylidene fluoride (PVDF) (hereinafter referred to as an LCO coated electrode) was used as the positive electrode instead of the LCO sintered plate, b) a mixed solvent of ethylene carbonate (EC) and ethyl methyl carbonate (EMC) in a ratio of 3:7 (volume ratio) containing 1 mol/L LiPF$_6$ was used as the electrolytic solution, and c) polyvinylidene fluoride (PVDF) was used as the negative electrode binder instead of SBR. The results are shown in Table 1A.

Example A3 (Comparative)

Batteries were prepared and evaluated as in Example A2 except that a mixed solvent of ethylene carbonate (EC) and diethyl carbonate (DEC) in a ratio of 3:7 (volume ratio) containing 1 mol/L LiPF$_6$ was used as the electrolytic solution. The results are shown in Table 1A.

Example A4 (Comparative)

Batteries were prepared and evaluated as in Example A1 except that a) a mixed solvent of ethylene carbonate (EC) and ethyl methyl carbonate (EMC) in a ratio of 3:7 (volume ratio) containing 1 mol/L LiPF$_6$ was used as the electrolytic solution, and b) polyvinylidene fluoride (PVDF) was used as the negative electrode binder instead of SBR. The results are shown in Table 1A.

Example A5 (Comparative)

Batteries were prepared and evaluated as in Example A4 except that a mixed solvent of ethylene carbonate (EC) and diethyl carbonate (DEC) in a ratio of 3:7 (volume ratio) containing 1 mol/L LiPF$_6$ was used as the electrolytic solution. The results are shown in Table 1A.

Example A6 (Comparative)

Batteries were prepared and evaluated as in Example A1 except that a mixed solvent of ethylene carbonate (EC) and ethyl methyl carbonate (EMC) in a ratio of 3:7 (volume ratio) containing 1 mol/L LiPF$_6$ was used as the electrolytic solution. The results are shown in Table 1A.

Example A7 (Comparative)

Batteries were prepared and evaluated as in Example A1 except that a mixed solvent of ethylene carbonate (EC) and diethyl carbonate (DEC) in a ratio of 3:7 (volume ratio) containing 1 mol/L LiPF$_6$ was used as the electrolytic solution. The results are shown in Table 1A.

Example A8 (Comparative)

Batteries were prepared and evaluated as in Example A1 except that a) a coated layer of a mixture of LiCoO$_2$ powder and polyvinylidene fluoride (PVDF) (i.e., an LCO coated electrode) was used as the positive electrode instead of the LCO sintered plate, and b) polyvinylidene fluoride (PVDF) was used as the negative electrode binder instead of SBR. The results are shown in Table 1B.

Example A9 (Comparative)

Batteries were prepared and evaluated as in Example A1 except that a coated layer of a mixture of LiCoO$_2$ powder and polyvinylidene fluoride (PVDF) (i.e., an LCO coated electrode) was used as the positive electrode instead of the LCO sintered plate. The results are shown in Table 1 B.

Example A10 (Comparative)

Batteries were prepared and evaluated as in Example A1 except that polyvinylidene fluoride (PVDF) was used as the negative electrode binder instead of SBR. The results are shown in Table 1B.

Example A11 (Comparative)

Batteries were prepared and evaluated as in Example A10 except that a mixed solvent of propylene carbonate (PC) and γ-butyrolactone (GBL) in a ratio of 1:3 (volume ratio) containing 1.5 mol/L LiBF$_4$ was used as the electrolytic solution. The results are shown in Table 1B.

Example A12 (Comparative)

Batteries were prepared and evaluated as in Example A1 except that a mixed solvent of propylene carbonate (PC) and γ-butyrolactone (GBL) in a ratio of 1:3 (volume ratio) containing 1.5 mol/L LiBF$_4$ was used as the electrolytic solution. The results are shown in Table 1B.

TABLE 1A

| | Positive electrode | | | Negative Electrode | | | | Resistance of battery | |
|---|---|---|---|---|---|---|---|---|---|
| | Active material | Binder | Electrolytic solution | Active material | Binder | Heating Temp. | Appearance of battery | Resistance change | Ratio to 20° C. |
| Ex. A1 | LCO sintered plate | No binder | EC + GBL(1:3) 1.5M LiBF$_4$ | Graphite | SBR | 20° C. | No change | No change | 1 |
| | | | | | | 100° C. | No change | No change | 1 |
| | | | | | | 110° C. | No change | No change | 1 |
| | | | | | | 120° C. | No change | No change | 1 |
| | | | | | | 150° C. | No change | No change | 1 |
| Ex. A2 (Comp.) | LCO coated electrode | PVDF | EC + EMC(3:7) 1M LiPF$_6$ | Graphite | PVDF | 20° C. | No change | No change | 1 |
| | | | | | | 100° C. | No change | Increase | 1.2 |
| | | | | | | 110° C. | Broken by swell | — | — |
| Ex. A3 (Comp.) | LCO coated electrode | PVDF | EC + DEC(3:7) 1M LiPF$_6$ | Graphite | PVDF | 20° C. | No change | No change | 1 |
| | | | | | | 100° C. | No change | Increase | 1.2 |
| | | | | | | 110° C. | No change | Increase | 1.5 |
| | | | | | | 120° C. | Broken by swell | — | — |
| Ex. A4 (Comp.) | LCO sintered plate | No binder | EC + EMC(3:7) 1M LiPF$_6$ | Graphite | PVDF | 20° C. | No change | No change | 1 |
| | | | | | | 100° C. | No change | Increase | 1.2 |
| | | | | | | 110° C. | Broken by swell | — | — |
| Ex. A5 | LCO sintered | No | EC + DEC(3:7) | Graphite | PVDF | 20° C. | No change | No change | 1 |

TABLE 1A-continued

| | Positive electrode | | | Negative Electrode | | | Resistance of battery | | |
|---|---|---|---|---|---|---|---|---|---|
| | Active material | Binder | Electrolytic solution | Active material | Binder | Heating Temp. | Appearance of battery | Resistance change | Ratio to 20° C. |
| (Comp.) | plate | binder | 1M LiPF₆ | | | 100° C. | No change | Increase | 1.2 |
| | | | | | | 110° C. | No change | Increase | 1.5 |
| | | | | | | 120° C. | Broken by swell | — | — |
| Ex. A6 (Comp.) | LCO sintered plate | No binder | EC + EMC(3:7) 1M LiPF₆ | Graphite | SBR | 20° C. | No change | No change | 1 |
| | | | | | | 100° C. | No change | Increase | 1.2 |
| | | | | | | 110° C. | Broken by swell | — | — |
| Ex. A7 (Comp.) | LCO sintered plate | No binder | EC + DEC(3:7) 1M LiPF₆ | Graphite | SBR | 20° C. | No change | No change | 1 |
| | | | | | | 100° C. | No change | Increase | 1.2 |
| | | | | | | 110° C. | No change | Increase | 1.5 |
| | | | | | | 120° C. | Broken by swell | — | — |

TABLE 1B

| | Positive electrode | | | Negative Electrode | | | Resistance of battery | | |
|---|---|---|---|---|---|---|---|---|---|
| | Active material | Binder | Electrolytic solution | Active material | Binder | Heating Temp. | Appearance of battery | Resistance change | Ratio to 20° C. |
| Ex. A8 (Comp.) | LCO coated electrode | PVDF | EC + GBL(1:3) 1.5M LiBF₄ | Graphite | PVDF | 20° C. | No change | No change | 1 |
| | | | | | | 100° C. | No change | Increase | 4 |
| | | | | | | 110° C. | No change | Increase | 7 |
| | | | | | | 120° C. | No change | Increase | 35 |
| | | | | | | 150° C. | No change | Increase | 3000 |
| Ex. A9 (Comp.) | LCO coated electrode | PVDF | EC + GBL(1:3) 1.5M LiBF₄ | Graphite | SBR | 20° C. | No change | No change | 1 |
| | | | | | | 100° C. | No change | Increase | 2 |
| | | | | | | 110° C. | No change | Increase | 5 |
| | | | | | | 120° C. | No change | Increase | 20 |
| | | | | | | 150° C. | No change | Increase | 1000 |
| Ex. A10 (Comp.) | LCO sintered plate | No binder | EC + GBL(1:3) 1.5M LiBF₄ | Graphite | PVDF | 20° C. | No change | No change | 1 |
| | | | | | | 100° C. | No change | Increase | 1.5 |
| | | | | | | 110° C. | No change | Increase | 3 |
| | | | | | | 120° C. | No change | Increase | 10 |
| | | | | | | 150° C. | No change | Increase | 500 |
| Ex. A11 (Comp.) | LCO sintered plate | No binder | PC + GBL(1:3) 1.5M LiBF₄ | Graphite | PVDF | 20° C. | No change | No change | 1 |
| | | | | | | 100° C. | No change | Increase | 1.5 |
| | | | | | | 110° C. | No change | Increase | 3 |
| | | | | | | 120° C. | No change | Increase | 10 |
| | | | | | | 150° C. | No change | Increase | 500 |
| Ex. A12 (Comp.) | LCO sintered plate | No binder | PC + GBL(1:3) 1.5M LiBF₄ | Graphite | SBR | 20° C. | No change | No change | 1 |
| | | | | | | 100° C. | No change | Increase | 1.2 |
| | | | | | | 110° C. | No change | Increase | 1.5 |
| | | | | | | 120° C. | No change | Increase | 2 |
| | | | | | | 150° C. | No change | Increase | 5 |

What is claimed is:

1. A secondary lithium battery, comprising:
a positive electrode plate that is a lithium complex oxide sintered plate and contains no binder;
a negative electrode containing graphite and styrene butadiene rubber (SBR); and
an electrolytic solution containing lithium borofluoride (LiBF₄) in a non-aqueous solvent composed of γ-butyrolactone (GBL), or composed of γ-butyrolactone (GBL) and ethylene carbonate (EC);
wherein the non-aqueous solvent has an EC:GBL volume ratio of 0:1 to 1:3, and
wherein the electrolyic solution has a LiBF₄ concentration of 0.5 to 2 mol/L.

2. The secondary lithium battery according to claim 1, further comprising a separator made of polyimide, polyester, or cellulose.

3. The secondary lithium battery according to claim 2, wherein the separator is made of polyimide.

4. The secondary lithium battery according to claim 1, wherein the electrolytic solution further comprises vinylene carbonate (VC), and/or fluoroethylene carbonate (FEC), and/or vinyl ethylene carbonate (VEC).

5. The secondary lithium battery according to claim 1, having a thickness of 0.45 mm or less.

6. The secondary lithium battery according to claim 1, wherein the lithium complex oxide is lithium cobaltate.

7. The secondary lithium battery according to claim 1, wherein the lithium complex oxide sintered plate includes a plurality of primary grains composed of the lithium complex oxide, and is an oriented positive electrode plate in which the plurality of primary grains is oriented with a mean orientation angle of more than 0° to 30° to a plate face of the positive electrode plate.

8. The secondary lithium battery according to claim 1, wherein the secondary lithium battery is intended to be mounted on a substrate by a process involving heating at 110° C. to lower than 260° C.

9. The secondary lithium battery according to claim 8, wherein the process involving heating is hot lamination or reflow soldering.

10. A method for manufacturing a battery-incorporating device, comprising the steps of:

providing the secondary lithium battery according to claim 1; and mounting the secondary lithium battery on a substrate by a process involving heating at 110° C. to lower than 260° C.

11. The method according to claim 10, wherein the process involving heating is hot lamination or reflow soldering.

12. The method according to claim 11, wherein the process involving heating is hot lamination, and the battery-incorporating device is a battery-incorporating smart card.

* * * * *